UNITED STATES PATENT OFFICE.

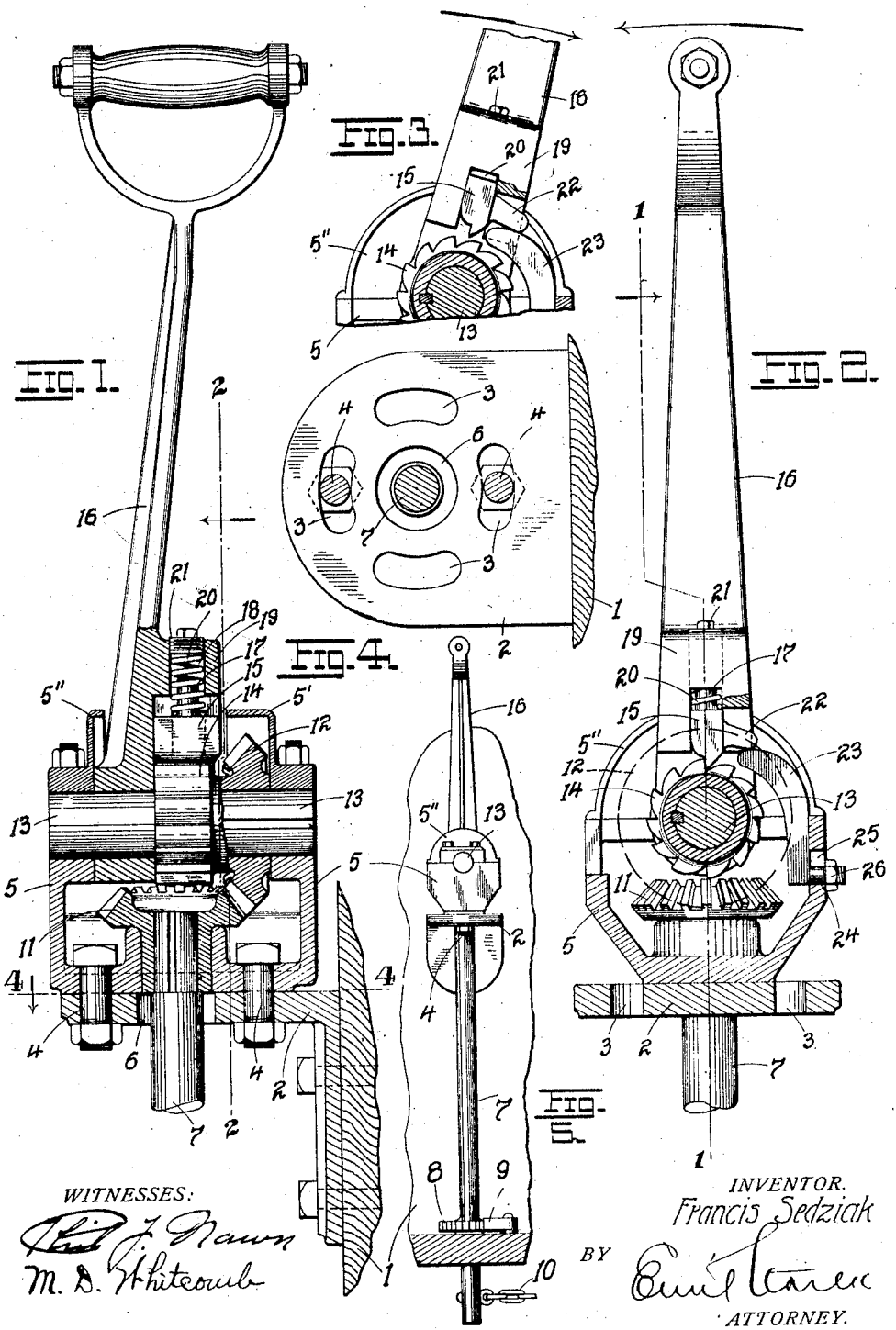

FRANCIS SEDZIAK, OF ST. LOUIS, MISSOURI.

BRAKE MECHANISM.

No. 873,905.     Specification of Letters Patent.     Patented Dec. 17, 1907.

Application filed August 23, 1906. Serial No. 331,776.

*To all whom it may concern:*

Be it known that I, FRANCIS SEDZIAK, a citizen of the United States, residing at St. Louis, State of Missouri, have invented certain new and useful Improvements in Brake Mechanism, of which the following is a full, clear, and exact description, reference being had to the accompanying drawings, forming a part hereof.

My invention has relation to improvements in brake mechanisms for cars, and it consists in the novel construction and arrangement of parts more fully set forth in the specification and pointed out in the claims.

In the drawings, Figure 1 is a front sectional elevation on the broken line 1—1 of Fig. 2; Fig. 2 is a vertical transverse section on line 2—2 of Fig. 1; Fig. 3 is a sectional detail showing the manner of disengaging the actuating pawl; Fig. 4 is a horizontal section on line 4—4 of Fig. 1; and Fig. 5 is an end elevation of the device showing the brake-staff in its entirety.

The object of my invention is to construct a brake mechanism for cars which will possess a great amount of leverage; one specially desirable where the room on the platform is limited; one which may be readily adjustable as to position; one developing a maximum degree of power, and one possessing further and other advantages better apparent from a detailed description of the invention which is as follows:

Referring to the drawings, 1, represents a stationary portion of the car or platform thereof, and 2 an angle bracket secured thereto. The horizontal leg of the bracket is provided with a series of curved elongated openings 3, for the reception of the securing bolts 4 which secure the bearing or housing 5 of the actuating mechanism presently to be referred to. Through the central opening 6 of the bracket 2 passes the upper end of the rotatable brake-staff 7 said staff being of the ordinary and well known construction, and being provided as usual at its base with the ratchet 8 and arresting or locking pawl 9. From the lower end leads a chain 10 to the brake-shoes and brake-beam as usual, these parts not being shown. The upper reduced end of the brake-staff carries a bevel-gear wheel 11 which meshes with a corresponding bevel gear 12 keyed to the shaft or spindle 13 supported in the bearing or housing 5, the hub of the gear 12 having formed integrally therewith, the ratchet disk 14 which is engaged by the advancing pawl 15 movably housed in a suitable cavity at the base of the operating lever 16 loosely and pivotally mounted about the shaft 13 to one side of the ratchet 14 and within the housing 5. The pawl 15 is provided with a stem 17 freely playing in a chamber 18 of the lateral formation or projection 19 of the operating lever, the stem being encircled by an expansion spring 20 whose one end bears against the pawl and the opposite end against a screw-plug 21, the latter serving to adjust the tension of the spring.

Formed integrally with the pawl 15 is a projecting lug or arm 22 which for an abnormal rearward oscillation or throw of the lever 16 engages and rides over the surface of a cam 23 which is adjustably secured to the bearing 5. The base of the cam or disengaging member 23 is provided with a stud or bolt 24 which passes through an elongated slot 25 of the bearing 5, a nut 26 serving to clamp the cam in position when once adjusted. The top of the bearing 5 is surmounted by the upper bearing sections 5, 5", respectively, between which the lever 16 is free to oscillate.

The operation of the device is as follows: By drawing or oscillating the lever 16 forward as shown by the curved arrow in Fig. 2, the pawl engaging the ratchet 14 rotates the shaft 13, the latter in turn through the medium of the gears 12 and 11 rotating the brake-staff, and winding the chain 10 which thus gradually applies the brakes. The brakeman may of course make several strokes to accomplish this, the pawl freely riding over the ratchet teeth for a rearward oscillation of the lever, during which time the staff is prevented from returning to its original position by the application of the locking pawl 9 against the ratchet 8. This of course is well understood. To release the brakes, the brakeman throws the lever rearwardly or in the opposite direction an abnormal distance, this movement causing the arm 22 of the pawl 15 to ride over the cam surface of the disengaging member 23 (Fig. 3), whereby the pawl is lifted out of the path of the ratchet 14. At the same time the brakeman kicks the locking pawl 9 out of engagement with its ratchet 8, the staff 7 being now free to turn back to its original position under the tension of the chain 10, and allowing the brakes to be released. Of course during the return rotation of the staff, the shaft 13 and ratchet 14 are set into rotation, being free to revolve owing to the disengaged position of the advancing pawl 15.

The lever 16 of course oscillates in a vertical plane, and if circumstances do not permit the free oscillation of the lever in a given direction owing to obstructions on the platform of the car, the bearing 5 may be adjusted rotatably through the medium of the bolts 4 and elongated slots 3, or even turned through an angle of ninety degrees (Fig. 4) and then clamped to the bracket 2, so that the lever may be permitted to oscillate in any direction convenient to the brakeman. So too, to vary the point of release of the pawl 15 from its ratchet 14, the cam 23 may be adjusted up and down. In this way the pawl may be released for a short or long rearward stroke of the lever 16.

Having described my invention, what I claim is:

In a brake mechanism, an oscillating lever, a pawl carried thereby, a shaft, a bearing therefor, a support for the bearing, and means for rotatably adjusting the position of the bearing on said support to vary the position of the plane of oscillation of the lever, substantially as set forth.

In testimony whereof I affix my signature, in presence of two witnesses.

FRANCIS SEDZIAK.

Witnesses:
 EMIL STAREK,
 MARY D. WHITCOMB.